(No Model.)
H. J. PHELPS.
WHEEL FOR SEEDING MACHINES.
No. 425,956. Patented Apr. 15, 1890.
Fig. 1.
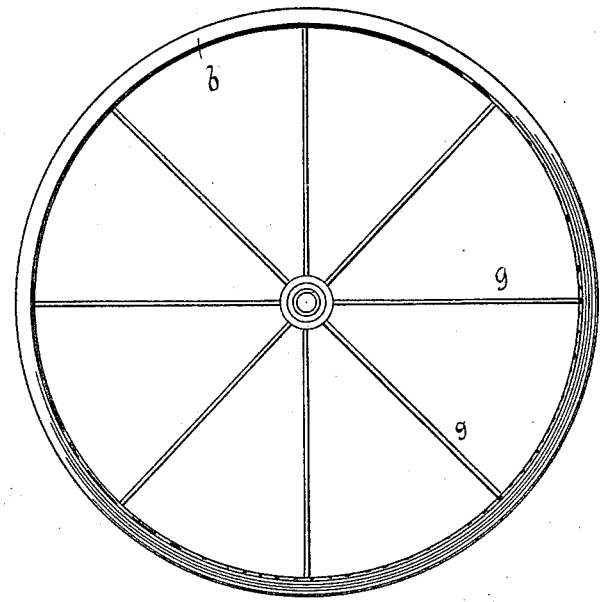
Fig. 2.
Fig. 4.
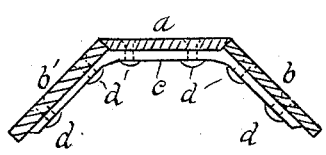
Fig. 5.
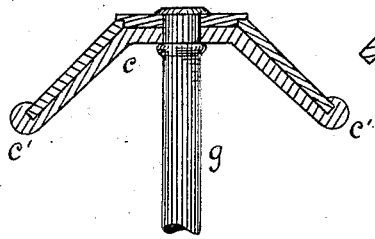
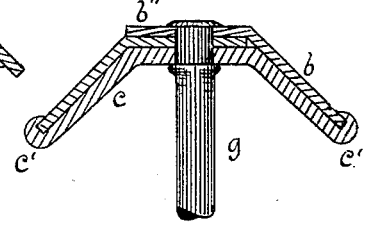
Fig. 3.
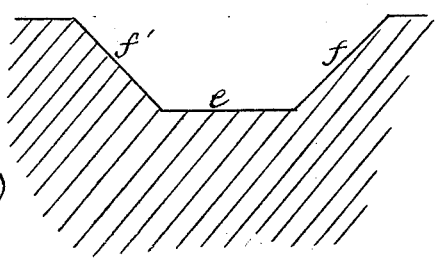
ATTEST
Helen Graham
W. W. Graham
INVENTOR
Harvey J. Phelps.
By L. P. Graham
his attorney

UNITED STATES PATENT OFFICE.

HARVEY J. PHELPS, OF HAVANA, ILLINOIS, ASSIGNOR TO JOHN W. RHODES, OF SAME PLACE.

WHEEL FOR SEEDING-MACHINES.

SPECIFICATION forming part of Letters Patent No. 425,956, dated April 15, 1890.

Application filed December 18, 1889. Serial No. 334,176. (No model.)

*To all whom it may concern:*

Be it known that I, HARVEY J. PHELPS, of the city of Havana, county of Mason, and State of Illinois, have invented an Improvement in Wheels for Seeding-Machines, of which the following is a specification.

My device is intended for use in grain-drills as a covering-wheel, and it is intended to form furrows with inclined sides compressed sufficiently to resist the action of wind and water.

In the drawings accompanying and forming a part of this specification, Figure 1 is a side view of a wheel having its rim or tire constructed in accordance with my invention. Fig. 2 is an enlarged transverse section taken through the rim between spokes and near a bridge or binding-brace. Fig. 3 is a section of a furrow formed with my wheel. Fig. 4 is a transverse section through the rim and a binding-brace, and Fig. 5 is a similar view, the purpose of the two last-named figures being to illustrate modifications of the invention.

The rim is composed of a plane central band $a$ and two oblique side bands $b\ b'$, all held together by binding-braces $c$. The braces may be riveted to the side bands, as shown in Fig. 2, where the rivets are indicated by $d$, or they may be held by the hooked terminations $c'$, as seen in Figs. 4 and 5. The central band may be riveted to the binding-braces, as seen in Fig. 2, or the spokes $g$ may be relied on to sustain it in contact with the braces and side bands, as indicated in Fig. 4. It is preferably formed separate from the side bands; but it may be composed of the lapping deflected portions $b''$, as shown in Fig. 5. The relative width of the bands may be varied to suit different circumstances, as may also the obliquity of the side bands.

In operation the wheel follows a furrow made by the seed-depositing runner of a grain-drill, forms the level surface $e$ over the grain, and firmly compresses the inclined sides $f\ f'$.

I claim—

1. A wheel-rim for seeding-machines, composed of two or more parts secured together by binding-braces and comprising a flat central portion and oblique side portions, as set forth.

2. A wheel-rim for seeding-machines, composed of a central band, oblique side bands, and binding-braces, as set forth.

In testimony whereof I sign my name in the presence of two subscribing witnesses.

HARVEY J. PHELPS.

Attest:
ISAAC N. MITCHELL,
GEO. GORDON.